D. JOHNSON.
Churn Dasher.
No. 47,259.
Patented April 11, 1865.
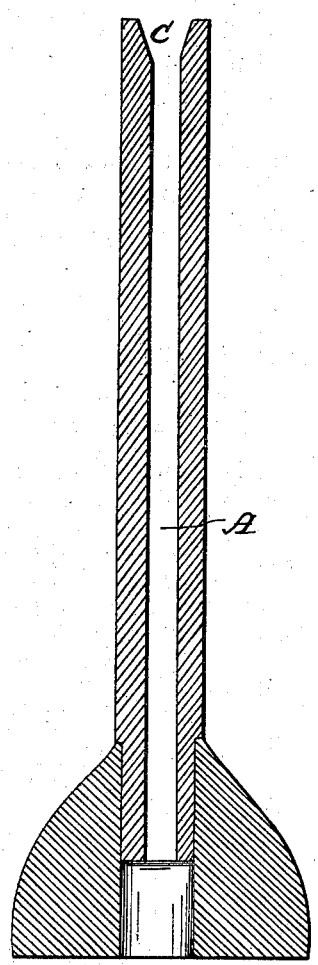
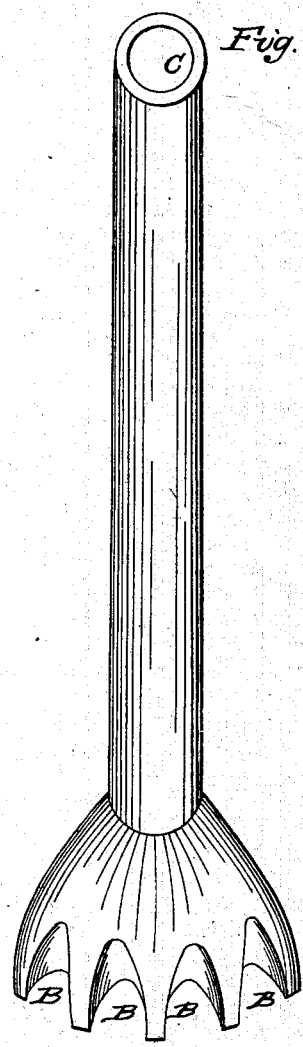

UNITED STATES PATENT OFFICE.

DANFORTH JOHNSON, OF CHICAGO, ILLINOIS.

IMPROVEMENT IN CHURN-DASHERS.

Specification forming part of Letters Patent No. 47,259, dated April 11, 1865.

*To all whom it may concern:*

Be it known that I, DANFORTH JOHNSON, of the city of Chicago, county of Cook, and State of Illinois, have invented a new and Improved Mode of Making Churn-Dashers; and I do hereby declare that the following is a full and exact description thereof, reference being had to the accompanying drawing, and to the letters of reference marked thereon, in which—

Figure 1 is a perspective view of my dasher.

The nature of my invention consists in constructing a wooden churn-dasher in the form of a parabolic conoid, with apertures cut out of the base of the dasher, as shown in Fig. 1, letter B.

To enable others to make and use my invention, I will describe its construction and operation.

I take a piece of wood of a sufficient diameter and thickness to form a dasher, turn it to the desired form, then cut out the apertures around the base, and bore a hole for the handle; insert the handle, and the dasher is complete.

To use my dasher, it requires a churn called "tub" or "barrel" or "crock" churn, such as are in common use with the farmer, and works up and down in the cream in the old-fashioned way, the same as the old-fashioned dasher.

The objects of making my dasher of this particular form are various.

First. The upper part of the dasher being oval, it moves much easier through the cream than it would were it flat.

Second. Another object of making my dasher oval is to gather the butter. It being lighter than the cream, it will rise to the top of the cream. As the dasher is raised, the particles of butter roll down the dasher toward the churn, effectually gathering the butter much quicker and better than any other known way.

Third. It causes more agitation in the cream, also friction to the sacks that hold the butter, by being grooved around the edge in this particular form, for each aperture at the base causes an independent current when the dasher is moved up or down through the cream, causing it to flow in sheets above the dasher into the open space in the churn, and by mingling with the air causes the cream to fall in drops and helps to divide the butter from the buttermilk. The apertures serve also to increase the amount of surface of the dasher.

Fourth. Another important point in the apertures is, they are made wedging from the bottom or face of the dasher toward the top or upper surface, so as to compress the cream when the dasher is pushed down into the cream thereby, and for the purpose of causing a friction and grinding the globules when compressed in the wedged openings or grooves in the edge of the dasher. Those wedging grooves also assist in giving force to the streams of cream as the dasher is forced down with a quick motion. It causes the compressed cream to expand suddenly as it leaves the grooves, which causes the globules to burst above the dasher, and in the opening that is filled with air in the upper part of the churn not filled with cream. By this arrangement the globules or sacks that hold the butter are burst in the air, thereby preventing the globules from closing again or secreting any portion of the butter.

Having thus fully described the construction and operation of my invention, what I desire to secure by Letters Patent is—

A wooden churn-dasher conical or oval on the top, with wedging apertures around the bottom edge of the dasher for compressing the cream, in the manner and for the purpose set forth.

DANFORTH JOHNSON.

Witnesses:
T. F. PROSSER,
P. A. HAYNE.